(12) United States Patent
Cohen et al.

(10) Patent No.: US 8,474,061 B2
(45) Date of Patent: *Jun. 25, 2013

(54) PRODUCTION SCALE FABRICATION METHOD FOR HIGH RESOLUTION AFM TIPS

(75) Inventors: Guy Cohen, Mohegan Lake, NY (US); Mark C. Reuter, Montrose, NY (US); Brent A. Wacaser, Garrison, NY (US); Maha M. Khayyat, Chappaqua, NY (US)

(73) Assignees: International Business Machines Corporation, Armonk, NY (US); King Abdulaziz City for Science and Technology, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,396

(22) Filed: Sep. 10, 2012

(65) Prior Publication Data

US 2012/0331593 A1 Dec. 27, 2012

Related U.S. Application Data

(63) Continuation of application No. 12/900,123, filed on Oct. 7, 2010, now Pat. No. 8,321,961.

(51) Int. Cl.
*G01Q 60/38* (2010.01)
*B82Y 40/00* (2011.01)

(52) U.S. Cl.
USPC .................................. 850/60; 850/58; 850/40

(58) Field of Classification Search
USPC ..................... 850/60, 58, 45, 40, 32, 29, 56
See application file for complete search history.

(56) References Cited

U.S. PATENT DOCUMENTS

| | | | |
|---|---|---|---|
| 7,572,300 B2 * | 8/2009 | Cohen et al. .................. | 850/58 |
| 7,823,216 B2 | 10/2010 | Fan et al. | |
| 7,913,544 B1 * | 3/2011 | Chand .............................. | 850/60 |
| 2006/0278825 A1 * | 12/2006 | van der Weide et al. ..... | 250/306 |
| 2007/0221840 A1 * | 9/2007 | Cohen et al. .................. | 250/306 |
| 2008/0131325 A1 * | 6/2008 | Espinosa et al. .............. | 422/100 |
| 2008/0197402 A1 | 8/2008 | Paek et al. | |
| 2009/0102019 A1 * | 4/2009 | Haight et al. ................. | 257/607 |
| 2009/0293162 A1 * | 11/2009 | Cohen et al. .................... | 850/40 |
| 2009/0308844 A1 | 12/2009 | Cohen et al. | |
| 2011/0186804 A1 * | 8/2011 | Khayyat et al. .................... | 257/9 |

OTHER PUBLICATIONS

Becker, M., et al., "Nanowires enabling signal-enhanced nanoscale Raman spectroscopy", Small, Apr. 2008, No. 4, pp. 398-404.
Fukunaka, Y., et al., "Producing Shape-Controlled Metal Nanowires and Nanotubes by an Electrochemical Method", Electrochemical and Solid State Letters, 2006, vol. 9, Issue 3, pp. C62-C64.
Tay, A. B. H., et al., "High-resolution nanowire atomic force microscope probe grown by a field-emission induced process", Applied Physics Letters, Jun. 21, 2004, vol. 84, No. 25.
Learning Space, "Structural Devices", The Open University, accessed on Apr. 27, 2010, http://openlearn.open.ac.uk/mod/resource/view.php?id=257270.

* cited by examiner

*Primary Examiner* — Robert Kim
*Assistant Examiner* — Wyatt Stoffa
(74) *Attorney, Agent, or Firm* — Scully, Scott, Murphy & Presser, P.C.; Louis J. Percello, Esq.

(57) ABSTRACT

A method of fabricating high resolution atomic force microscopy (AFM) tips including a single semiconductor nanowire grown at an apex of a semiconductor pyramid of each AFM tip is provided. The semiconductor nanowire that is grown has a controllable diameter and a high aspect ratio, without significant tapering from the tip of the semiconductor nanowire to its base. The method includes providing an AFM probe including a semiconductor cantilever having a semiconductor pyramid extending upward from a surface of said semiconductor cantilever. The semiconductor pyramid has an apex. A patterned oxide layer is formed on the AFM probe. The patterned oxide layer has an opening that exposes the apex of the semiconductor pyramid. A single semiconductor nanowire is grown on the exposed apex of the semiconductor pyramid utilizing a non-oxidized Al seed material as a catalyst for nanowire growth.

16 Claims, 9 Drawing Sheets

PRODUCTION SCALE FABRICATION METHOD FOR HIGH RESOLUTION AFM TIPS

CROSS REFERENCE TO RELATED APPLICATION

This application is a continuation of U.S. patent application Ser. No. 12/900,123, filed Oct. 7, 2010 the entire content and disclosure of which is incorporated herein by reference.

BACKGROUND

The present disclosure relates to a method of fabricating high resolution Atomic Force Microscopy (AFM) tips and, more particularly to a method of fabricating high resolution AFM tips that have a controllable diameter and a high aspect ratio.

Atomic force microscopy (AFM) is a very high resolution type of scanning probe microscopy, with demonstrated resolution on the order of fractions of a nanometer, which is more than 1000× better than the optical diffraction limit. The AFM is one of the foremost tools for imaging, measuring, and manipulating matter at the nanoscale level. The information is gathered by "sensing" the surface with a mechanical probe or tip. Piezoelectric elements that facilitate tiny but accurate and precise movements on (electronic) command enable very precise scanning. In some variations, using conducting cantilevers is necessary. In newer more advanced AFMs, current can even be passed through the tip to probe the electrical conductivity or transport of the underlying surface.

The AFM consists of a cantilever with a sharp tip at its end that is used to scan a sample surface. The cantilever is typically silicon or silicon nitride with a tip radius of curvature on the order of nanometers. When the tip is brought into proximity of a sample surface, forces between the tip and the sample lead to a deflection of the cantilever according to Hooke's law. Depending on the situation, forces that are measured in AFM include mechanical contact force, van der Waals forces, capillary forces, chemical bonding, electrostatic forces, magnetic forces, Casimir forces, solvation forces, etc. Along with force, additional quantities such as, electrical potential, conductivity, and/or transport, may simultaneously be measured through the use of specialized types of probes.

Conventional AFM tips are fabricated by anisotropic etching of silicon, Si. These tips are formed at the end of a silicon cantilever and typically have a shape of a pyramid with triangular sides defined by Si (111) surfaces. The drawback of such prior art AFM tips is their poor lateral imaging resolution due to their low aspect ratio and large radius of curvature of about 5 nm-30 nm (best case).

When using AFM to image a property of the surface, the resolution is strongly dependent on the diameter and aspect ratio of the tip. In some instances, a high aspect ratio AFM tip is important when imaging steeply rising steps or narrow trenches. A high aspect ratio is also important when the forced sensed is a long range force. When the force is a long range force, the force decays as $a/r^n$ wherein "a" is a constant, n is a positive integer and r is the distance of the tip to the surface. In such a case, not just the atoms at the apex contribute to sensing but the whole tip contributes to the interaction with the surface. Also, in such a case, the higher the aspect ratio and the smaller the tip radius, the better the resolution. The current solutions to this problem including forming nanomaterials such as carbon nanotubes or semiconductor nanowires at the end of the Si tip have limited aspect ratios, are not production scale processes, require more difficult lithographic techniques, or have limited control as to the placement and morphology of the tip enhancements.

As such, a method is needed that is capable of fabricating high resolution AFM tips that have a controllable diameter as well as a high aspect ratio. Also, there is a need for providing high resolution AFM tips that have little or no tapering associated therewith.

SUMMARY

The present disclosure provides a method of fabricating high resolution AFM tips including a single semiconductor nanowire grown at an apex of a semiconductor pyramid of each AFM tip which has a controllable diameter (from 5 nm to 200 nm with additional thinning) and a high aspect ratio, e.g., length to width ratio, (on the order of greater than 100), without significant tapering from the tip of the semiconductor nanowire to its base. The term "without significant tapering" is used throughout the present application to denote a semiconductor nanowire where the wire diameter changes by less than about 10% from the base of the wire to the tip of the wire. The AFM tips that are provided herein have a high lateral imaging resolution.

In one aspect of the present disclosure, a method of fabricating a high resolution AFM tip having the above mentioned properties is provided that includes providing an AFM probe including a semiconductor cantilever having a semiconductor pyramid extending upward from a surface of the semiconductor cantilever. The semiconductor pyramid includes an apex. A patterned oxide layer is formed on the AFM probe. The patterned oxide layer has an opening that exposes the apex of the semiconductor pyramid. A single semiconductor nanowire is grown on the exposed apex of the semiconductor pyramid utilizing a non-oxidized Al seed material as a catalyst for nanowire growth. Since the single semiconductor nanowire is grown from the exposed apex of the semiconductor pyramid, the semiconductor nanowire is an epitaxial semiconductor nanowire. The semiconductor nanowire that is formed includes a p-doped semiconductor nanowire core that is surrounded by an undoped semiconductor shell. The non-oxidized Al seed material is present at the tip of the p-doped semiconductor nanowire core. The non-oxidized Al seed material and the undoped semiconductor shell can be removed providing a p-doped semiconductor nanowire extending from the apex of the semiconductor pyramid.

The p-doped semiconductor nanowire that extends from the apex of the semiconductor pyramid is conductive and has a controllable diameter and a high aspect ratio, without significant tapering from the tip of the p-doped semiconductor nanowire to its base. Also, the p-doped semiconductor nanowire that is provided by the present disclosure is stiff enough such that it can be inserted into a biological cell. Moreover, the method of the present disclosure can be used to tailor the dimension and the direction of the p-doped semiconductor nanowire that is produced according to specific imaging needs. Furthermore, the method of the present disclosure can also be employed for the mass production of AFM tips which can be easily implemented into any standard Si AFM cantilever.

The growth of semiconductor nanowires using an Al-based catalytic process as disclosed in the present application is different from semiconductor nanowires that are grown using a gold (Au) catalyst. First, Al selectively grows a semiconductor nanowire only on a bare semiconductor surface not from an oxide surface. Gold, however, grows a semiconductor nanowire from the oxide surface, in addition to a Si surface. Further, and as stated above, semiconductor nanowires grown from Al provide a unique opportunity to sharpen the AFM tip which cannot be obtained from semiconductor nanowires grown from Au. Specifically, semiconductor nanowires grown from Al provide a doped semiconductor core with a radial undoped semiconductor shell surrounding the core. The undoped semiconductor shell surrounding the core can be selectively removed forming a high resolution AFM tip that has a controllable diameter and a high aspect ratio without significant tapering. In addition to the above, Al is easier to remove than Au, and Al is more electronically friendly than Au as it does not form deep traps in silicon that could degrade device characteristics.

In another aspect of the present disclosure, a high resolution AFM tip is provided that includes an AFM probe including a semiconductor cantilever having a semiconductor pyramid extending upward from a surface of the semiconductor cantilever, the semiconductor pyramid having an apex; and a single Al-doped semiconductor nanowire on the exposed apex of the semiconductor pyramid, wherein the single Al-doped semiconductor nanowire is epitaxial with respect to the apex of the semiconductor pyramid.

DETAILED DESCRIPTION

The present disclosure, which provides a method of fabricating high resolution AFM tips, will now be described in greater detail by referring to the following discussion and drawings that accompany the present disclosure. It is noted that the drawings are provided for illustrative purposes only and are not drawn to scale.

In the following description, numerous specific details are set forth, such as particular structures, components, materials, dimensions, processing steps and techniques, in order to illustrate the present disclosure. However, it will be appreciated by one of ordinary skill in the art that various embodiments of the present disclosure may be practiced without these, or with other, specific details. In other instances, well-known structures or processing steps have not been described in detail in order to avoid obscuring the various embodiments of the present disclosure.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As stated above and in one aspect of the present disclosure, a method of fabricating a high resolution AFM tip having a controllable diameter and a high aspect ratio, without significant tapering is provided. The AFM tips that are provided herein have a high lateral imaging resolution. The method includes providing an AFM probe including a semiconductor cantilever having a semiconductor pyramid extending upward from a surface of the semiconductor pyramid. The semiconductor pyramid has an apex. A patterned oxide layer is formed on the AFM probe. The patterned oxide layer has an opening that exposes the apex of the semiconductor pyramid. A single semiconductor nanowire is grown on the exposed apex of the semiconductor pyramid using a non-oxidized aluminum seed material as a catalyst for nanowire growth. The semiconductor nanowire that is formed includes a p-doped semiconductor nanowire core that is surrounded by an undoped semiconductor shell. The non-oxidized aluminum seed material is present at the tip of the p-doped semiconductor nanowire core. The non-oxidized aluminum seed material and the undoped semiconductor shell can be removed providing a p-doped semiconductor nanowire extending from the apex of the semiconductor pyramid.

Figure 1:
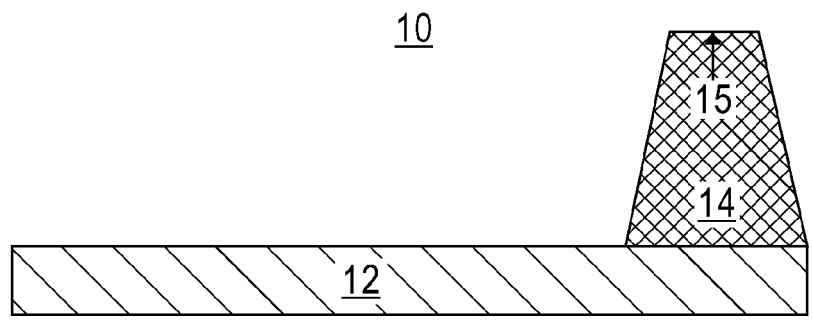
FIG. 1 is a pictorial representation (through a cross sectional view) depicting an AFM probe including a semiconductor cantilever having a semiconductor pyramid extending upward from a surface of the semiconductor cantilever that can be employed in one embodiment of the present disclosure.

Referring first to FIG. 1, there is illustrated an AFM probe 10 that includes a semiconductor cantilever 12 having a semiconductor pyramid 14 extending upward from a surface of the semiconductor cantilever 12 that can be employed in one embodiment of the present disclosure. As shown in FIG. 1, the semiconductor pyramid has an apex 15. The AFM probe 10 shown in FIG. 1 is present on a surface of semiconductor wafer (not shown). In some embodiments (not shown), the AFM probe 10 is present in an array of AFM probes 10. The array of AFM probes 10 would be similar to the array of AFM probes shown in FIG. 2 of U.S. Patent Application Publication No. 2009/0308844 to Cohen et al., the entire content of which is incorporated herein by reference.

The term "semiconductor" is used throughout the present application to denote any semiconductor material such as, Si, Ge, SiGe, SiC, and SiGeC, in which semiconductor nanowires can be grown using an Al catalyzed process. The semiconductor material used in forming the AFM probe 10 may also comprise an organic semiconductor or a layered semiconductor such as, for example, Si/SiGe, a silicon-on-insulator (SOI), a SiGe-on-insulator (SGOI) or a germanium-on-insulator (GOI). In some embodiments, the AFM probe 10 is composed of a Si-containing semiconductor material, i.e., a semiconductor material that includes silicon. To reduce the cost of the AFM probe silicon (Si) is typically selected as the preferred semiconductor for making AFM probe 10.

The AFM probe 10 including cantilever 12 and pyramid 14 may be single crystalline, polycrystalline, or amorphous. In one embodiment, the AFM probe 10 including the cantilever 12 and the pyramid 14 is single crystalline; the common fabrication method that is used to form pyramid 14 is by anisotropic etching of single-crystal silicon. The semiconductor employed as the AFM probe 10 including the cantilever 12 and the pyramid 14 may have any crystallographic orientation. For example, and when Si is employed as the semiconductor material, the Si may have a (111), (100) or (110) crystal orientation.

The AFM probe 10 shown in FIG. 1 can be formed utilizing techniques that are well known in the art. For example, the AFM probe 10 can be formed by micromachining. In some embodiments in which the pyramid 14 is comprised of Si, the pyramid 14 can be formed by anisotropic etching of silicon. For example, a masked etching of silicon with potassium hydroxide (KOH) exhibits a very slow etching of Si (111) planes. As a result, a pyramid whose sides are Si (111) planes is formed.

Figure 2:
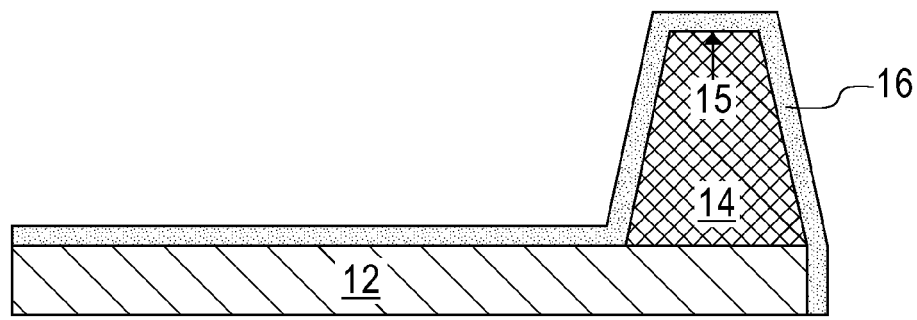
FIG. 2 is a pictorial representation (through a cross sectional view) depicting the structure of FIG. 1 after forming an oxide layer on the AFM probe.

Referring now to FIG. 2, there shown the structure of FIG. 1 after forming an oxide layer 16 on the AFM probe 10 including on the upper surfaces of the semiconductor cantilever 12 and the semiconductor pyramid 14. In one embodiment, the oxide layer 16 that is formed is comprised of a semiconductor oxide such as, for example, silicon oxide, or germanium oxide. In another embodiment, the oxide layer 16 is comprised of a metal oxide. The oxide layer 16 may be comprised of a single oxide material or, it may be comprised of a multilayered stack of oxide materials such as, for example, a stack of a semiconductor oxide and a metal oxide including, for example, ZnO, NiO, $HfO_2$, $ZrO_2$, $La_2O_3$, $Al_2O_3$, $TiO_2$, $SrTiO_3$, $LaAlO_3$, $Y_2O_3$, $HfO_xN_y$, $ZrO_xN_y$, $La_2O_xN_y$, $Al_2O_xN_y$, $TiO_xN_y$, $SrTiO_xN_y$, $LaAlO_xN_y$, and $Y_2O_xN_y$. Each value of x is independently varied from 0.5 to 3 and each value of y is independently varied from 0 to 2. In embodiment of the present disclosure, the oxide layer 16 is comprised of silicon oxide.

The thickness of the oxide layer 16 may vary depending on, for example, the technique used in forming the same as well as the type of oxide material that is employed in forming the oxide layer 16. Typically, the oxide layer 16 has a thickness that is greater than 3 nm, with a thickness from 40 nm to 60 nm being more typical in some embodiments of the present disclosure.

The oxide layer 16 can be formed utilizing techniques that are well known to those skilled in the art. In one embodiment, the oxide layer 16 is formed by a conventional thermal oxidation process. In another embodiment, the oxide layer 16 is formed by a deposition method including, but not limited to, chemical vapor deposition (CVD), plasma enhanced chemical vapor deposition (PECVD), molecular beam deposition (MBE), pulsed laser deposition (PLD), liquid source misted chemical vapor deposition (LSMCVD) and atomic layer deposition. Combinations of the above techniques can also be employed in forming the oxide layer 16. In one embodiment of the present disclosure, and when the oxide layer 16 is silicon oxide, thermal oxidation (at a temperature from 700° C. to 1100° C.) can be employed in forming the oxide layer. A low temperature thermal oxidation exhibits a higher oxidation rate for Si (111) than for Si (100). This will result in a thicker oxide on Si (111) surfaces than on Si (100). When the oxidation temperature is high the oxidation rates is less dependent on the silicon surface orientation.

Figure 3:
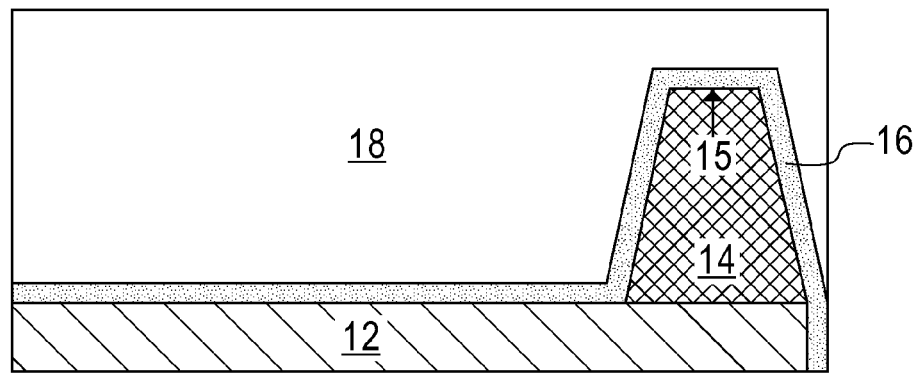
FIG. 3 is a pictorial representation (through a cross sectional view) depicting the structure of FIG. 2 after forming a photoresist on an upper surface of the oxide layer.

Referring now to FIG. 3, there is illustrated the structure of FIG. 2 after forming a photoresist 18 on an upper surface of the oxide layer 16. The photoresist 18 that can be employed in the present disclosure includes a positive-tone photoresist material, a negative-tone photoresist material or a hybrid photoresist that includes both positive-tone and negative-tone properties. The photoresist is formed on the upper surface of the oxide layer 16 utilizing any conventional deposition process including, for example, spray coating or spin-on coating. The thickness of the applied photoresist 18 has to be at least larger than the height of pyramid 14. As can be seen in FIG. 3, pyramid 14 is submerged in photoresist 18. As can also be seen in FIG. 3 the photoresist 18 planarizes the surface of the structure. Due to planarization, the thickness of the photoresist 18 over the apex 15 is less than the thickness of the photoresist 18 over the cantilever 12.

Figure 4:
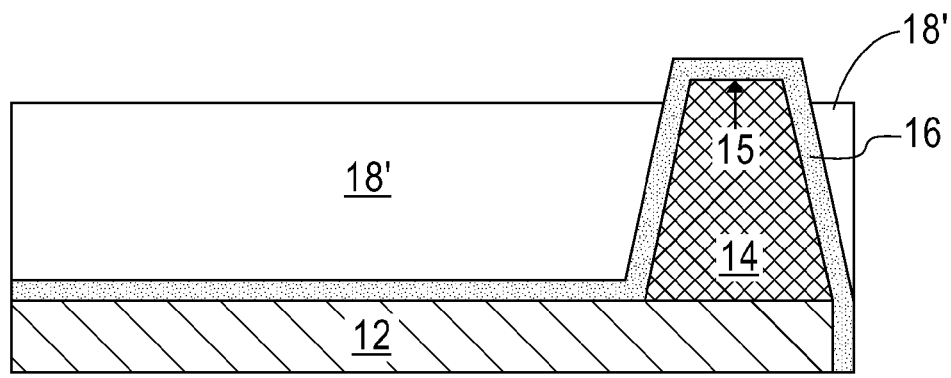
FIG. 4 is a pictorial representation (through a cross sectional view) depicting the structure of FIG. 3 after patterning the photoresist to include an opening that exposes the oxide layer that is present on an apex of the semiconductor pyramid.

Referring now to FIG. 4, there is illustrated the structure of FIG. 3 after patterning the photoresist 18 into patterned photoresist 18'. The patterned photoresist 18' includes an opening that exposes the oxide layer 16 that is present on the apex 15 of the semiconductor pyramid 14. The patterning of the photoresist 18 into patterned photoresist 18' can be performed utilizing a controlled oxygen plasma ashing process. The controlled oxygen plasma ashing process that can be used in the present disclosure to pattern the photoresist 18 removes the photoresist material from the apex 15 of the semiconductor pyramid. The removal rate of the photoresist 18 by oxygen plasma ashing is uniform. Since the apex 15 is the highest point in the structure, the apex 15 will be exposed first while the rest of the structure will remain submerged in the patterned photoresist 18'. An optical end-point detection scheme can be used in some instances to accurately stop the resist etching when the apex 15 is exposed.

Figure 5:
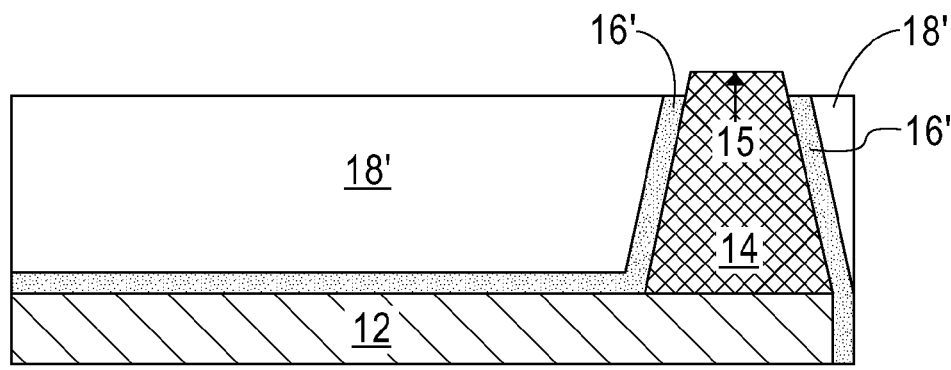
FIG. 5 is a pictorial representation (through a cross sectional view) depicting the structure of FIG. 4 after removing the exposed oxide layer from the apex of the semiconductor pyramid exposing the apex of the semiconductor pyramid.

Reference is now made to FIG. 5 which depicts the structure of FIG. 4 after removing the exposed oxide layer 16, not protected by the patterned photoresist 18', from the apex 15 of the semiconductor pyramid 14. The removal of the exposed oxide layer 16, not protected by the patterned photoresist 18', exposes the apex 15 of the semiconductor pyramid 14. In FIG. 5, reference numeral 16' denotes the patterned oxide layer that is formed.

The removal of the exposed oxide layer is performed utilizing any etching process that selectively removes oxide as compared to a photoresist material, stopping on the underlying semiconductor surface. In one embodiment of the present disclosure, the removal of the exposed oxide layer 16, not protected by the patterned photoresist 18', can be performed utilizing an oxide etchant such as, for example, HF or buffered HF. It is noted that when HF or buffered HF are employed, the exposed apex 15 of the semiconductor pyramid 14 is epitaxially clean. By "epitaxial clean" it is meant that the exposed apex 15 of the semiconductor pyramid 14 is free of residual oxides or other contaminates that may hinder the epitaxial growth of the semiconductor nanowire from that surface.

Figure 6:
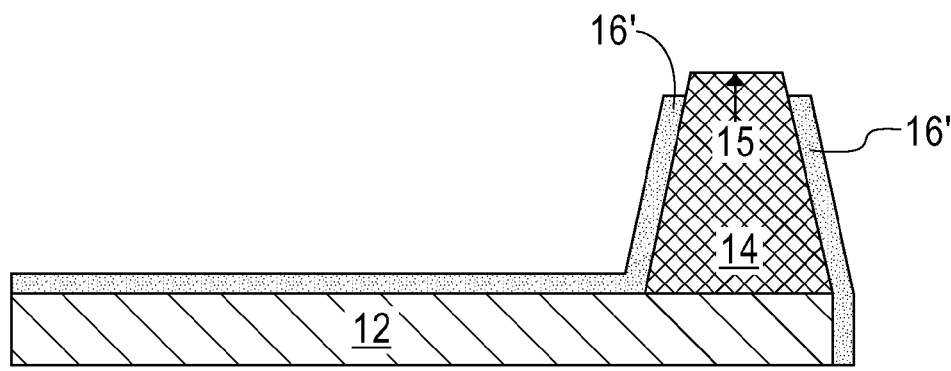
FIG. 6 is a pictorial representation (through a cross sectional view) depicting the structure of FIG. 5 after removing the patterned photoresist.

Referring now to FIG. 6, there is illustrated the structure of FIG. 5 after removing the patterned photoresist 18' from atop the patterned oxide layer 16'. The removal of the patterned photoresist 18' from the structure includes any conventional resist stripping process. For example, acetone followed by isopropyl alcohol (IPA) can be used to remove the patterned photoresist from the structure. Alternatively, oxygen plasma can be employed to remove the patterned photoresist 18'. When oxygen plasma is employed, a diluted HF dip can be used to remove any thin oxide from the exposed apex 15 that may have formed during oxygen plasma.

Figure 7:
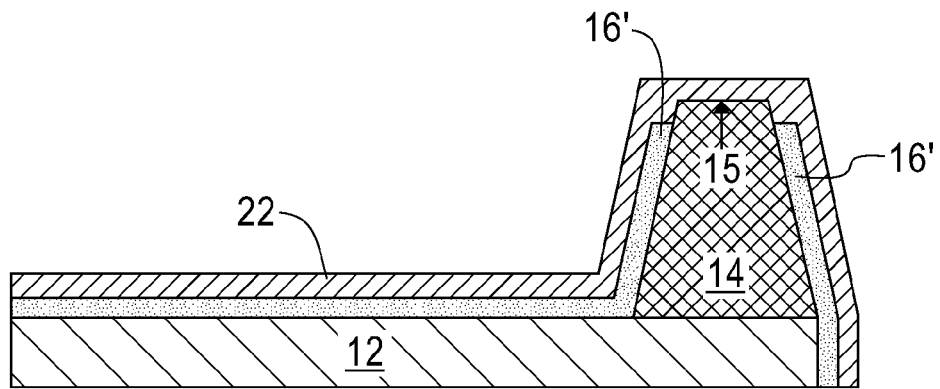
FIG. 7 is a pictorial representation (through a cross sectional view) depicting the structure of FIG. 6 after forming a layer of aluminum on the remaining oxide layer and on the exposed apex of the semiconductor pyramid.

Next, and as shown in FIG. 7, a layer of aluminum 22 is formed on the remaining oxide layer, i.e., patterned oxide layer 16', as well as on the exposed apex 15 of the semiconductor pyramid 14. The layer of aluminum 22 has a high affinity for reacting and forming a complex with oxygen that is present within the underlying patterned oxide layer 16' during a subsequent annealing process. It is noted that the layer of aluminum 22 that is present on the exposed apex 15 of the semiconductor pyramid 14 will subsequently serve as a catalyst for nanowire growth.

The layer of aluminum 22 can be formed utilizing any deposition process including, for example, evaporation, chemical vapor deposition (CVD), ultra high vacuum chemical vapor deposition (UHVCD), plasma enhanced chemical vapor deposition (PECVD), atomic layer deposition (ALD), sputtering, and plating. Whichever technique is employed, the layer of aluminum 22 should not be directly exposed to air or an oxygen containing environment prior to nanowire growth. In one embodiment, evaporation is employed inside of the load lock chamber of an UHCVD system for forming the layer of aluminum 22 and the structure is not removed from the UHV environment until after the nanowires are grown.

The thickness of the layer of aluminum 22 that is formed may vary depending on the technique used in forming the Al layer and the type of patterned oxide layer 16' employed. The layer of aluminum 22 should be thin enough so that the chemical reaction with the underlying oxide layer makes the entire Al layer over the patterned oxide layer unavailable to act as a seed for nanowire growth. Typically, the thickness of the layer of aluminum 22 is from 0.5 nm to 100 nm, with a thickness from 2 nm to 10 nm being more typical.

Figure 8:
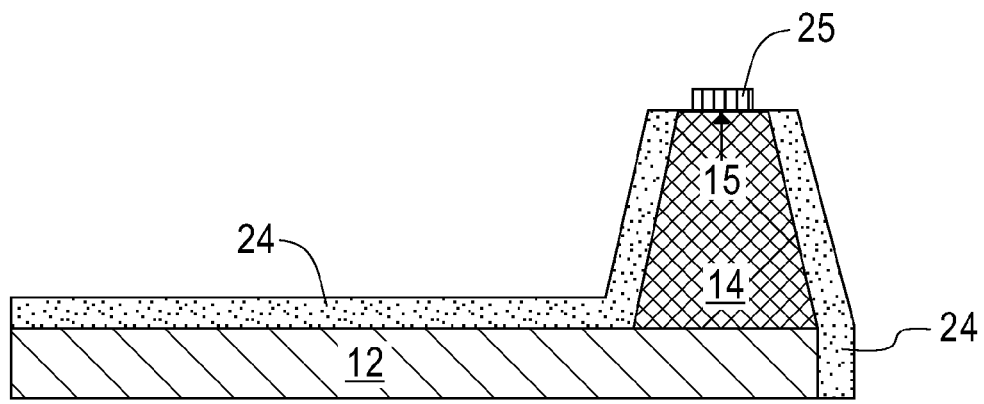
FIG. 8 is a pictorial representation (through a cross sectional view) depicting the structure of FIG. 7 after annealing.

Referring now to FIG. 8, there is shown the structure of FIG. 7 after annealing. The annealing process employed causes the Al within layer 22 to react with the oxygen within the patterned oxide layer 16' forming a patterned compound oxide layer 24 that includes a combination of the elements within layers 16' and 22. For example, when the patterned oxide layer 16' comprises silicon oxide, the annealing process provides a patterned compound oxide layer 24 that includes atoms of Al, Si and oxygen. The patterned compound oxide layer 24 is no longer active as a seed for nanowire growth.

It is observed that the above mentioned reaction that forms the patterned compound oxide layer 24 occurs in areas in which the layer of aluminum 22 is in direct contact with the patterned oxide layer 16'. It is further observed that in those areas both layers 16' and 22 can be completely or partially consumed during this annealing process. In some embodiments, a portion of the patterned oxide layer 16' which is in proximity to the semiconductor pyramid 14 is not completely consumed.

It is even yet further observed that in the area of the structure in which the layer of aluminum 22 is located directly on an exposed apex 15 of the semiconductor pyramid 14, the aluminum balls up forming a non-oxidized semi-sphere or faceted crystal of aluminum. The non-oxidized semi-sphere or faceted crystal of aluminum can be used as a non-oxidized Al seed material 25 for nanowire growth.

The structure shown in FIG. 8 thus includes an area conducive for nanowire growth (e.g., the area including the non-oxidized Al seed material 25), and areas that are not conducive for nanowire growth (e.g., areas including the patterned compound oxide layer 24).

The annealing may include a furnace anneal, a laser anneal, a microwave anneal, or a rapid thermal anneal. In one embodiment, the anneal includes a furnace anneal in an UHVCVD chamber. Notwithstanding the type of anneal employed, the anneal is typically performed at a temperature that is equal to, or greater than the eutectic temperature of an alloy of Al and the exposed apex 15 of the semiconductor pyramid 14. This helps in the Al material ball up. In some embodiments, the anneal is performed at a temperature that is equal to, or greater than, 200° C. In one embodiment in which Al on Si is employed, the anneal is typically performed at a temperature above 577° C., with a temperature from 600° C. to 750° C. being more typical. In some embodiments in which the anneal is limited to the surface only, such as a laser anneal, higher temperatures can be employed. In one embodiment, the annealing process can be conducted in an inert atmosphere including, for example, helium, argon, xenon and mixtures thereof. In yet another embodiment, a forming gas ambient can be employed. In yet another embodiment, an ultra high vacuum environment can be used. Irrespective of which type of inert or reducing atmosphere is used the level of oxygen must be such that the Al is not oxidized in the areas where the non-oxidized Al seed material 24 is designed to form. The annealing process may employ a single temperature, or various ramp and soak cycles can be employed.

Figure 9:
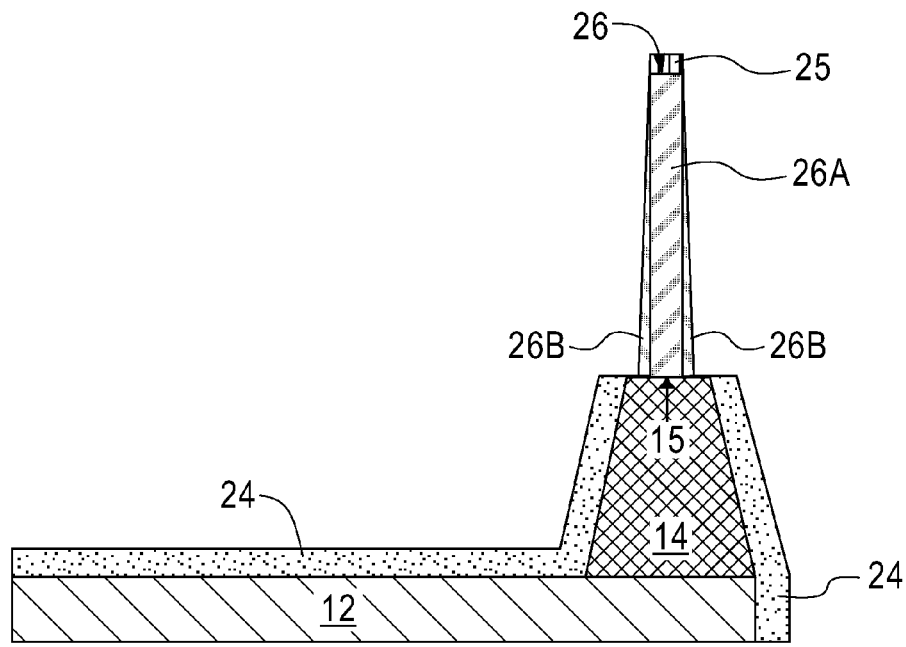
FIG. 9 is a pictorial representation (through a cross sectional view) depicting the structure of FIG. 8 after growing a semiconductor nanowire on the exposed apex of the semiconductor pyramid using a non-oxidized Al seed material that is formed during annealing as a catalyst for nanowire growth.

Referring to FIG. 9, there is shown the structure of FIG. 8 after growing a single semiconductor nanowire 26 from the non-oxidized Al seed material 25. The growth of the single semiconductor nanowire 26, which is assisted by the non-oxidized Al seed material 25, is typically carried out by chemical vapor deposition (CVD), ultra high vacuum chemical vapor deposition (UHCVD), or plasma enhanced chemical vapor deposition (PECVD) utilizing any of the well known semiconductor nanowire precursors. The nanowire precursor can be in liquid form, gaseous form or in vaporous form. The growth temperature may vary depending on the type of semiconductor nanowire precursor employed. Typically, the semiconductor nanowire 26 is grown at a temperature from 200° C. to 1400° C., with a growth temperature from 430° C. to 700° C. being more typical. The pressure employed in growing the semiconductor nanowire 26 may vary depending on the growth temperature, the type of precursor employed as well as the type of reactor employed in forming the nanowire. Typically, the pressure employed in forming the semiconductor nanowire 26 is from 0.01 torr to 760 torr, with a pressure from 0.1 torr to 10 ton being more typical. Examples of semiconductor nanowire precursors that can be employed in forming the semiconductor nanowires 26 include any Si-containing precursor such, for example, silane (SiH$_4$) and chlorosilanes.

In one embodiment, and when silane (SiH$_4$) is used to grow silicon nanowires, the growth temperature is typically from 430° C. to 520° C. In another embodiment in which other precursors such as, for example, silicon tetrachloride (SiCl$_4$), are employed as the semiconductor nanowire precursor the growth temperature is typically from 800° C. to 1200° C. By adding chlorine to SiH$_4$, the growth temperature can be raised to above 600° C. The growth rate of the semiconductor nanowire 26 depends on the growth temperature and the gas pressure in the growth chamber. For example, a typical CVD growth rate of silicon nanowires grown with SiH$_4$ diluted with H$_2$ (1:1) at a pressure of 0.5 torr and a growth temperature of 490° C. is about 5.6 μm/hour.

Without wishing to be bound by any theory, the growth of semiconductor nanowire 26 is believed to be best described by the vapor-liquid-solid (VLS) mechanism. See, for example, B. A. Wacaser et al. "Preferential Interface Nucleation: An Expansion of the VLS Growth Mechanism for Nanowires." Advanced Materials 2009, 21 (2), 153-165. During the annealing step and or/when the growth is initiated, a metallic-semiconductor solid or liquid alloy is formed. With additional supply of semiconductor precursor from the gas phase, the metallic-semiconductor droplet becomes supersaturated with semiconductor material and the excess semiconductor is deposited at the solid-liquid interface. As a result, the liquid droplet rises from the original substrate surface to the tip of a growing nanowire crystal. After semiconductor nanowire 26 growth, the metallic semiconductor liquid alloy will partially separate during cooling forming a metal-semiconductor solid alloy. As a result the liquid or solid alloy reverts back to material comprised primarily of the non-oxidized Al seed material 25 after cooling.

The orientation of the semiconductor nanowire 26 can be the same as that of the underlying apex 15 of the semiconductor pyramid 14 since it is epitaxially formed from that surface. The fabrication of nanocrystals by nanowire growth facilitates the formation of nanocrystals with near identical length, size, and orientation. Epitaxial nanowire growth typically occurs in a (111) crystallographic growth direction, but can also be achieved on other crystal orientations including, but not limited to, (100), (110), (211) and (311).

The semiconductor nanowire 26 that is formed may comprise the same or different semiconductor material as that of semiconductor pyramid 14. In one embodiment, the semiconductor nanowire 26 is comprised of a Si-containing semiconductor material, with a silicon nanowire being preferred.

The length and aspect ratio of the semiconductor nanowire 26 that is formed can be controlled by selecting a certain temperature, duration and pressure during nanowire growth. The direction of the epitaxial growth of the semiconductor nanowire 26 is determined by the crystal orientation of the apex 15 of the semiconductor pyramid 14. For example, a vertical aligned, e.g. perpendicular, semiconductor nanowire 16 will grow on a Si (111) surface, however, a tilted semiconductor nanowire 26 with a certain angle will typically grow on a Si (100) surface.

The semiconductor nanowire 26 that is formed includes a p-doped semiconductor nanowire core 26A that is surrounded by an undoped semiconductor shell 26B. The non-oxidized Al seed material 25 is present at the tip of the p-doped semiconductor core 26A. The undoped semiconductor shell is tapered because it grows at a constant rate on the sides of the nanowire as it grows. The undoped semiconductor shell 26B is thicker at the base of the nanowire because this part of the nanowire is grown first and thus the undoped semiconductor shell has a longer time to grow. The dopant from the seed material 25 does not directly affect the growth rate of undoped semiconductor shell 26B and thus it is not typically incorporated in the shell.

Figure 10:
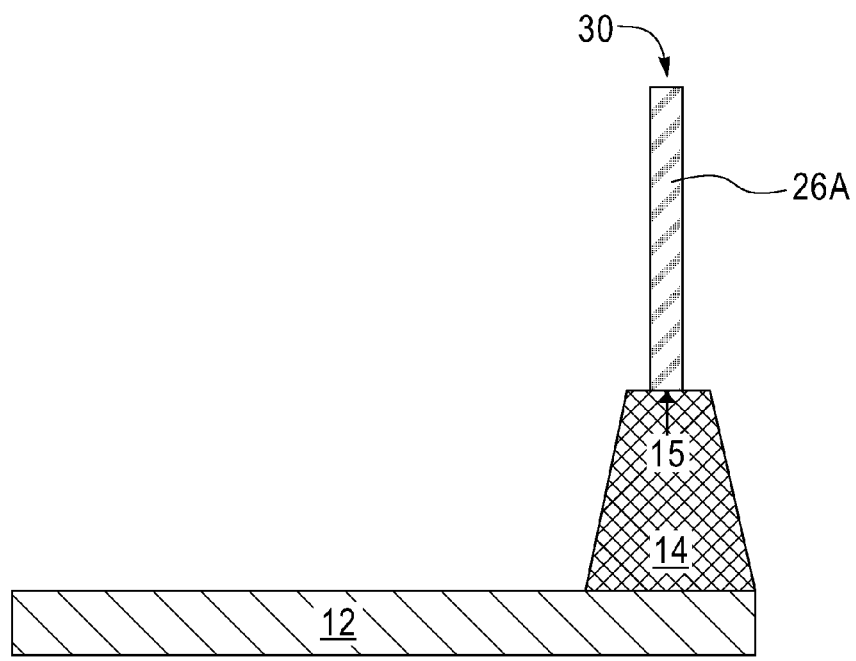
FIG. 10 is a pictorial representation (through a cross sectional view) depicting the structure of FIG. 9 after removing an undoped shell portion of the semiconductor nanowire and the remaining oxide layer leaving an aluminum doped semiconductor nanowire on the apex of the semiconductor pyramid, wherein the aluminum doped semiconductor nanowire has a high aspect ratio (greater than 100:1) with little or no tapering.

Referring to FIG. 10, there is shown the structure of FIG. 9 after removing, the non-oxidized Al seed material 25, the undoped semiconductor shell 26B and the remaining oxide layer, i.e., compound oxide 26 and/or remaining oxide layer 16' not consumed during annealing, leaving a p-doped, i.e., aluminum doped, semiconductor nanowire 30 (i.e., the p-doped semiconductor nanowire core 26A) on the apex 15 of the semiconductor pyramid 14.

The non-oxidized Al seed material 25 can be removed from the tip of the p-doped semiconductor nanowire core 26A by selective etching. For example, HF will selectively etch the non-oxidized Al seed material 25 from the tip of the p-doped semiconductor nanowire core 26A. The undoped semiconductor shell 26B can be removed utilizing an etching process that selectively removes an undoped semiconductor material relative to a doped semiconductor. In one embodiment, tetramethylammonium hydroxide (TMAH) or potassium hydroxide (KOH) can be used to remove the undoped semiconductor shell 26B. In some embodiments in which the exposed apex is a Si (111) surface, the exposed apex previously including the undoped shell portion typically does not etch in TMAH or KOH since these etchant are anisotropic and exhibit a very low etch rate for Si (111) surfaces relative to other surface orientations. Additionally, it was found that at low growth temperatures the undoped shell portion of the semiconductor nanowire contains many crystal defects. These defects further enhanced the etching rate of the shell portion of the nanowire with respect to the semiconductor nanowire core.

The compound oxide layer 24, and optionally, any remaining portions of the patterned oxide layer 16' not previously consumed during annealing, can be removed from the surface of the AFM probe 10 utilizing a conventional etching process that is capable of selectively removing the compound oxide layer 24 and optionally any remaining patterned oxide layer 16' from the structure. In one embodiment, etching in HF can be used to selectively remove the compound oxide layer 24 and optionally any remaining patterned oxide layer 16' from the structure.

The surfaces (top and sidewalls) of the p-doped semiconductor nanowire 30 and, if exposed, the underlying AFM probe 10 can be cleaned to remove any native oxide therefrom utilizing a stripping process that is well known to those skilled in the art.

The p-doped semiconductor nanowire 30 has a length, l, as measured from the apex 15 of the semiconductor pyramid 14 to the tip of the p-doped semiconductor nanowire 30. The p-doped semiconductor nanowire 30 has an aspect ratio (length/diameter) of greater than 100:1. It is also noted that no interface exists between the base of the p-doped semiconductor nanowire 30 and the apex 15. The diameter of the p-doped semiconductor nanowire 30 is from 20 nm to 200 nm; smaller diameters can be achieved by utilizing the thinning process illustrated in FIGS. 10 and 11, which is described in greater detail herein below.

The p-doped semiconductor nanowire 30 that extends from the apex 15 of the semiconductor pyramid 14 is conductive and has a controllable diameter and a high aspect ratio, without significant tapering from the tip of the p-doped semiconductor nanowire to its base. Also, the p-doped semiconductor nanowire 30 that is provided by the present disclosure is stiff enough such that it can be inserted into a biological cell.

Moreover, the method of the disclosure can be used to tailor the dimension and the direction of the p-doped semiconductor nanowire 30 that is produced according to specific imaging needs. Furthermore, the method of the present disclosure can also be employed for the mass production of AFM tips which can be easily implemented into any standard Si AFM cantilever.

Figure 11:
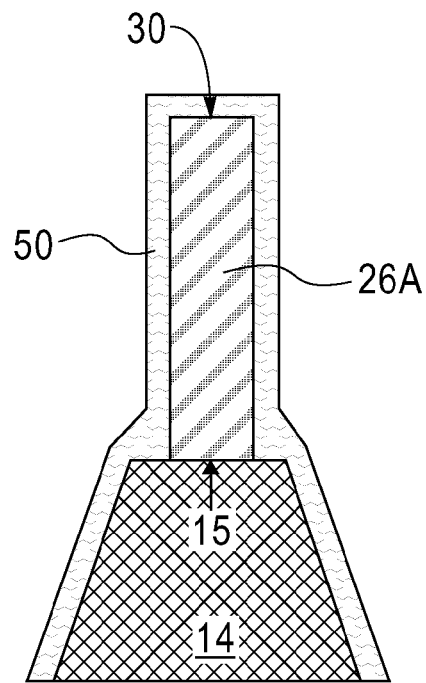
FIGS. 11-12 are pictorial representations (through cross sectional views) depicting the structure of FIG. 10 after performing successive stages of an oxidation sharpening process.

In some embodiments of the present disclosure, the p-doped semiconductor nanowire 30 shown in FIG. 10 can be subjected to an optional thinning step. When such a thinning step is employed the diameter of the thinned p-doped semiconductor nanowire can be less than 20 nm. The optional thinning step can be used to increase the resolution of the p-doped semiconductor nanowire 30 by decreasing the width of the semiconductor nanowire. This aspect of the present disclosure which can be referred to as an oxidation sharpening technique is now described in greater detail by referring to FIGS. 11-12 and the following discussion. Referring first to FIG. 11, there is shown a bird's eye view of the pyramidal portion of the structure of FIG. 10 after performing an optional thermal oxidation step. The optional thermal oxidation step forms a surface oxide layer 50 on the p-doped semiconductor nanowire 30 as well as any exposed semiconductor surfaces, such as, for example, the semiconductor pyramid 14 and the semiconductor cantilever 12.

The thickness of the surface oxide layer 50 that is formed may vary depending on the conditions of the thermal oxidation process employed. The surface oxide layer thickness will depend on the initial diameter of the p-doped semiconductor nanowire 30. As a rule of thumb, each 2.2 nm of oxide growth consumes 1 nm of silicon. As an example, assume that the initial diameter of the p-doped semiconductor nanowire is 20 nm, and thinning to a diameter of 10 nm is desired. In such a case, one needs to consume 5 nm from the nanowire radius which requires a growth of 11 nm of a surface oxide layer. The optional thermal oxidation step is typically performed at a temperature from 700° C. to 1100° C. The optional thermal oxidation step is performed in an oxygen-containing ambient including, for example, $O_2$, $H_2O$, air, ozone and steam. Additional oxidation steps can be used to control thinning of the semiconductor nanowire.

Figure 12:
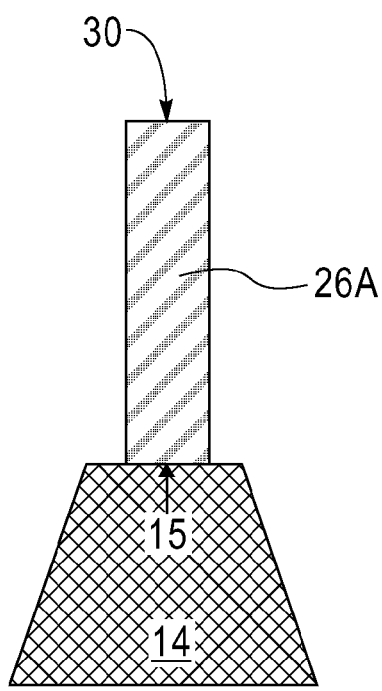

Referring now to FIG. 12, there is illustrated the structure of FIG. 11 after removing the surface oxide layer 50 from the p-doped semiconductor nanowire 30. The removal of the surface oxide layer 50 can be performed utilizing an etch that selectively removes oxide as compared to a semiconductor material. In one embodiment, Hf or buffered HF can be employed to remove the surface oxide layer 50 from the p-doped semiconductor nanowire 30.

Reference is now made to FIGS. 13-16, which depict another embodiment of the present disclosure for defining the region at the apex of the semiconductor pyramid in which a semiconductor nanowire will be grown therefrom. This embodiment relies on the different oxidation rates that the (111) and (100) planes have. In silicon, the (111) plane has the highest oxidation rate while the (100) has the lowest oxidation rate. It is noted that in this embodiment no photoresist is required in defining the area for nanowire growth as was the case in the embodiment described above in regard to FIGS. 1-10.

Figure 13:
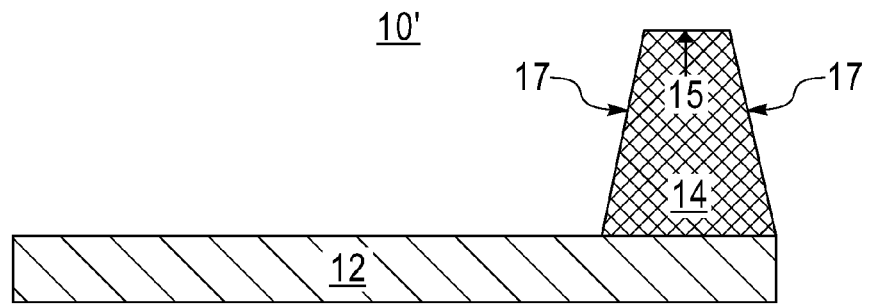
FIGS. 13-16 are pictorial representations (through cross sectional views) depicting another embodiment of the present disclosure for defining the region at the apex of the semiconductor pyramid for nanowire growth.
Figure 14:
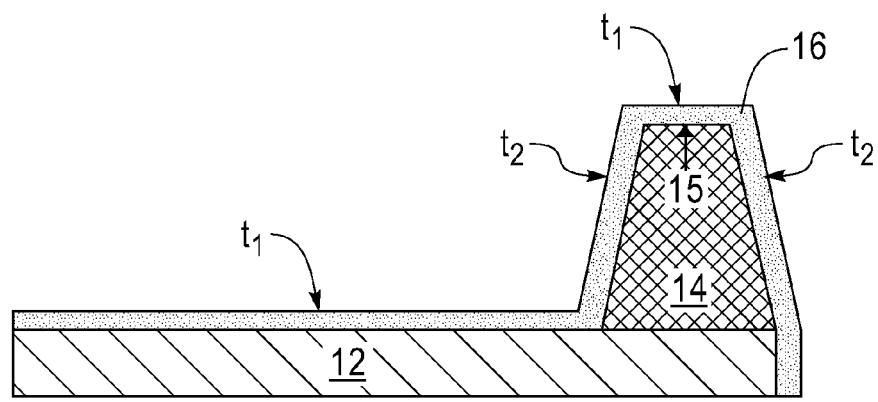
Figure 15:
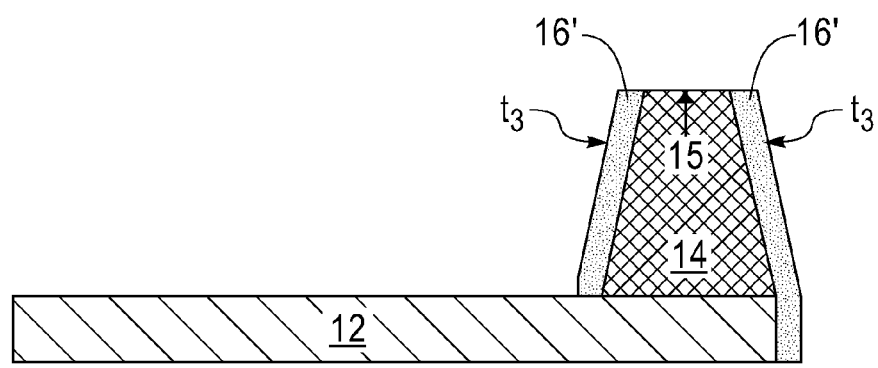

Specifically, FIG. 13 shows an AFM probe 10' that includes semiconductor cantilever 12 comprised of Si (100). The AFM probe 10' also includes a semiconductor pyramid 14 having sidewalls 17 comprised of Si (111) and an apex 15 comprised of Si (100). The AFM probe 10' is fabricated as described above in regard to the AFM probe 10 shown in FIG. 1. FIG. 14 shows the structure of FIG. 13 after forming an oxide layer 16 on the exposed semiconductor surface. The oxide layer 16 is formed by oxidation in this embodiment and because of the different oxidation rates that the (111) and (100) planes have, the oxide layer 16 has a different thickness. For example, the oxide layer over the (100) planes is thinner than the oxide layer over the (111) planes. In FIG. 14, $t_1$ represents the thinner portion of oxide layer 16 and $t_2$ represents the thicker portion of oxide layer 16. FIG. 15 shows the structure of FIG. 14 after removing the thinner portion $t_1$ of oxide layer leaving the thicker portion on the (111) Si sidewalls 17 of semiconductor pyramid 14; it is noted that in this step the thicker portion $t_2$ is thinned to $t_3$ wherein $t_3 \leq t_2 - t_1$ ($t_3$ is equal or less than $t_2 - t_1$). As is illustrated, the (100) surface at the apex 15 of the semiconductor pyramid 14 is exposed. Also, exposed is the (100) horizontal surface of the semiconductor cantilever 12. The remaining thicker portion $t_2$ of oxide layer is labeled as 16' since it serves as a patterned oxide layer in the structure. The removal of the thinner portion $t_1$ of oxide layer 16 relative to the thicker portion $t_2$ of the oxide layer 16 is performed by etching in buffed HF or diluted.

Figure 16:
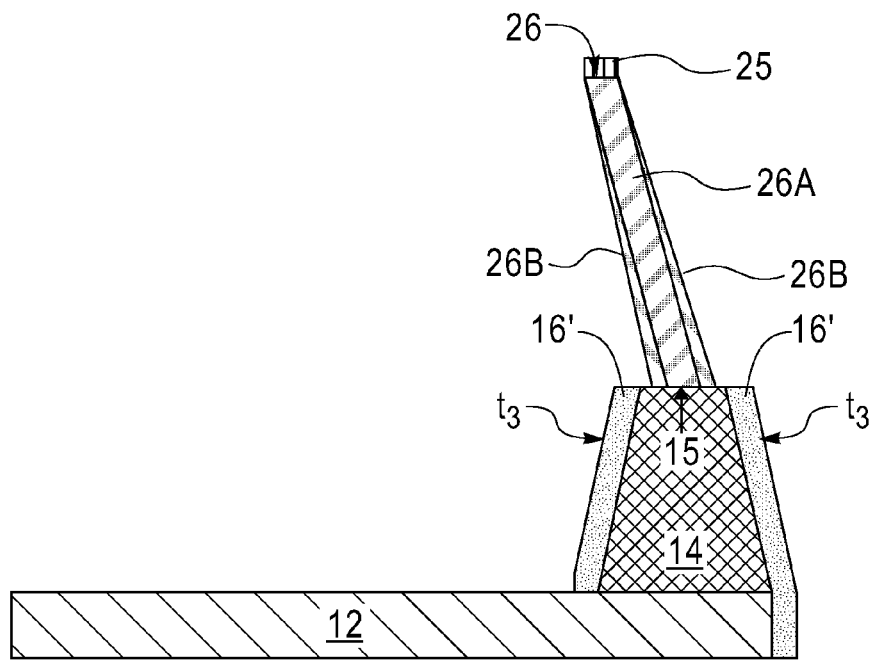

FIG. 16 illustrates the structure that is formed after semiconductor nanowire 26 growth. In this embodiment, semiconductor nanowires will also grow from the exposed horizontal surface of the semiconductor cantilever 12. The semiconductor nanowires that are grown from the exposed horizontal surface of the semiconductor cantilever are not shown in FIG. 16 so as not to obscure the growth of the semiconductor nanowire on the apex 15 of the semiconductor pyramid 14. The semiconductor nanowires that will grow on the (100) horizontal surface of the semiconductor cantilever will not interfere with the AFM imaging because their height is much less than the combined height of the semiconductor pyramid 14 and the semiconductor nanowire 26 at the apex 15 of the semiconductor pyramid 14. The semiconductor nanowire growth in this embodiment includes forming a layer of Al on the structure of FIG. 15, annealing and epitaxial growing the semiconductor nanowire from a non-oxidized Al seed material 25. The formation of the layer of Al, annealing and epitaxial growth are the same as described above in FIGS. 7, 8, and 9, respectively. Note that the steps shown in FIG. 10 can be performed on the structure shown in FIG. 16 to provide a high resolution AFM tip in accordance with the present disclosure. It is noted that in this embodiment the semiconductor nanowire grown on a (100) plane is at an oblique angle (54.7°) to the (100) surface. This is a result of the nanowire principle axis being along the (111) direction. In some embodiments, the oxidation sharpening technique mentioned above can be performed here for this embodiment as well.

Reference is now made to FIGS. 17-21, which represents a further embodiment of the present disclosure for defining the region at the apex of the semiconductor pyramid in which the semiconductor nanowire will be grown therefrom. This method does not depend on surface orientations but rather use the fact that many film depositions produce non-conformal films when the film is deposited over non planar surface (e.g. the faces of the pyramid). The deposited film is typically thinner on a vertical surface and thicker on a horizontal surface. In this embodiment, the AFM probe 10 illustrated in FIG. 1 can be employed.

Figure 17:
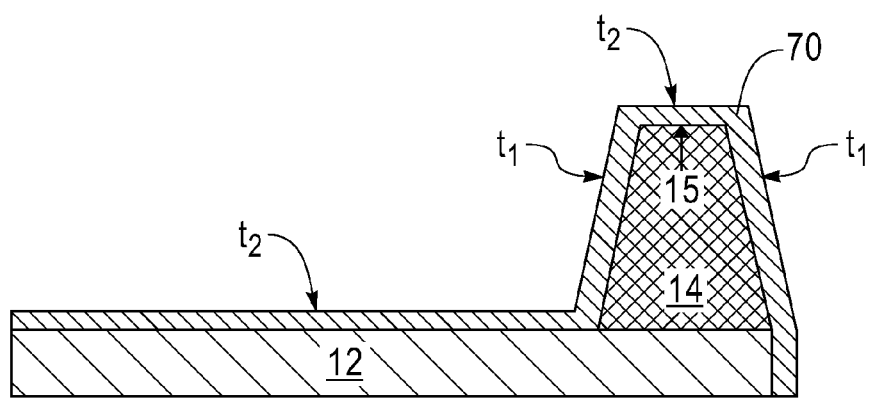
FIGS. 17-21 are pictorial representations (through cross sectional views) depicting a further embodiment of the present disclosure for defining the region at the apex of the semiconductor pyramid for nanowire growth.

Referring now to FIG. 17, there is shown the AFM probe 10 of FIG. 1 after forming a non-conformal film 70 on the exposed surfaces of the AFM probe. As mentioned above, the deposited non-conformal film 70 is typically thinner ($t_1$) on a vertical surface and thicker ($t_2$) on a horizontal surface. The non-conformal film 70 is formed utilizing any non-conformal deposition process such as, for example, evaporation and chemical vapor deposition (CVD). In one embodiment, the non-conformal film 70 may comprise a nitride such as silicon nitride. In another embodiment, the non-conformal film 70 may comprise a metal such as, for example, Al. When Al is employed as the non-conformal film 70, the portion that is present atop the apex 15 of the semiconductor pyramid 14 can be used to subsequently grow a semiconductor nanowire therefrom.

Figure 18:
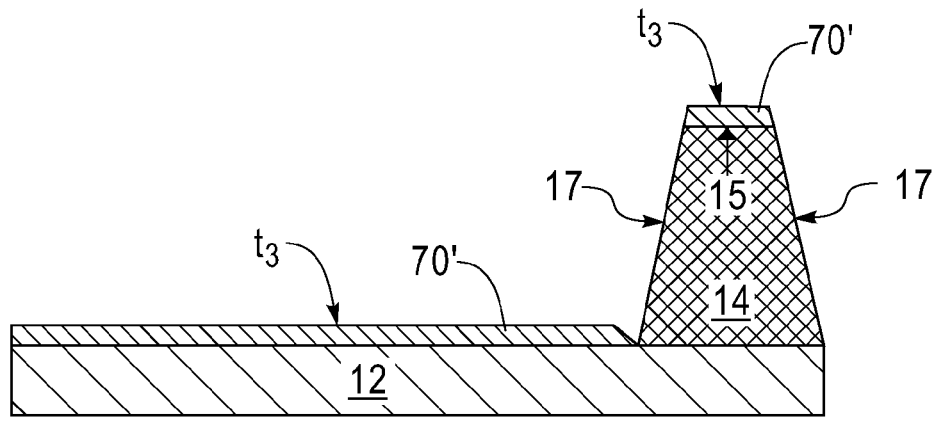

After deposition and as shown in FIG. 18, the non-conformal film 70 is etched with an isotropic etchant to expose the sidewalls 17 of the semiconductor pyramid 14, but the thick portion of the non-conformal film 70 on horizontal surfaces is not fully etched. The unetched portions of the non-conformal film 70 are now used as an oxidation blocking mask and are labeled as 70' in FIG. 18. As is shown, oxidation blocking mask 70' has a thickness $t_3$ which is smaller than original thickness $t_2$ by more than the amount $t_1$ ($t_3 \leq t_2 - t_1$).

Figure 19:
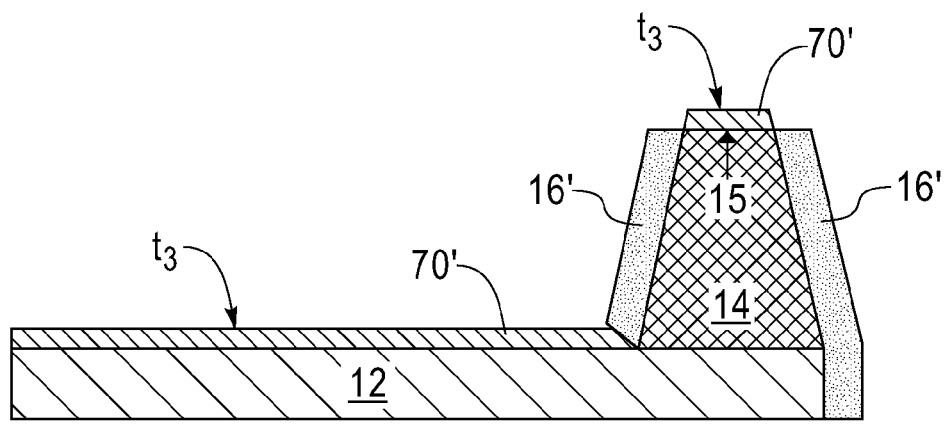

The exposed sidewalls 17 of the semiconductor pyramid 14 are thermally oxidized to form a patterned oxide layer 16' thereon. The resultant structure including the patterned oxide layer 16' that is formed after thermal oxidation is shown in FIG. 19. The thermal oxidation is the same as described above in the first embodiment for forming oxide layer 16.

Figure 20:
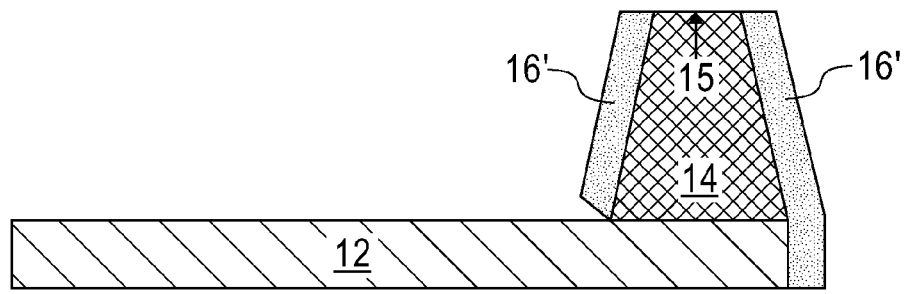

Reference is now made to FIG. 20, which shows the structure after the thermal oxidation blocking mask 70' is removed from the horizontal surface of the semiconductor cantilever 12 and optionally from the apex 15 of the semiconductor pyramid 14. The embodiment shown in FIG. 20 shows the removal of the thermal oxidation blocking mask 70' from both the horizontal surface of the cantilever and the apex of the semiconductor pyramid. It is noted that in instances when Al is used as the non-conformal film, the Al on the apex 15 of the semiconductor pyramid 14 may remain on the AFM probe and can be used as the catalyst to grow the nanowire thereon. When the Al is to remain on the apex 15, a block mask can be formed to protect the Al that is present on top the apex 15 of the semiconductor pyramid 14. The removal of the thermal oxidation blocking mask 70' can be performed utilizing any etching process that selectively removes the material of the thermal oxidation blocking mask 70' relative to the patterned oxide layer 16'.

Figure 21:
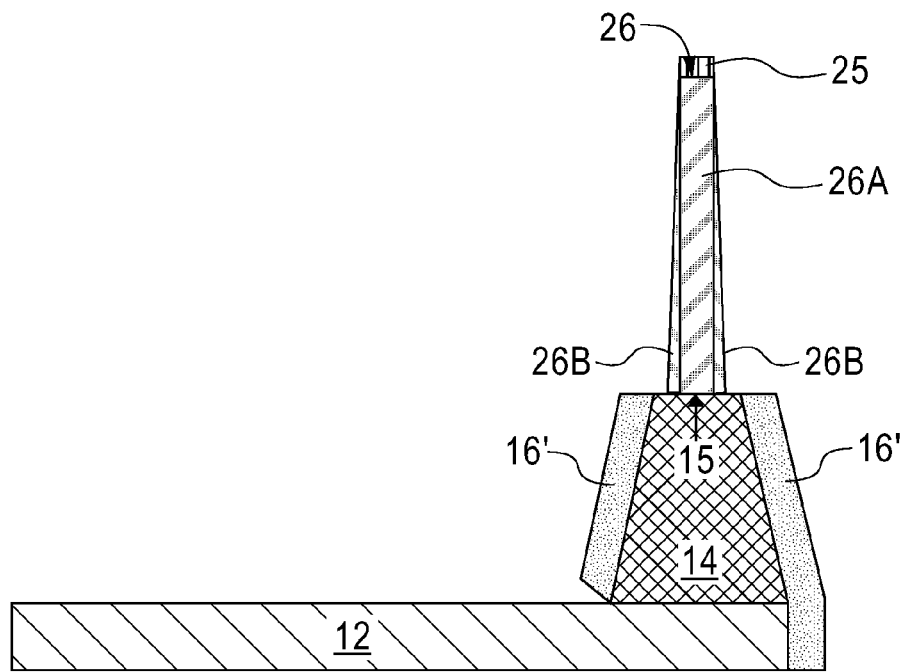

FIG. 21 illustrates the structure that is formed after semiconductor nanowire 26 growth. The semiconductor nanowire growth in this embodiment includes optionally forming a layer of Al on the structure of FIG. 20, annealing and epitaxial growing the semiconductor nanowire from a non-oxidized Al seed material 25. The optional formation of the layer of Al, annealing and epitaxial growth are the same as described above in FIGS. 7, 8, and 9, respectively. Note that the steps shown in FIG. 10 can be performed on the structure shown in FIG. 21 to provide a high resolution AFM tip in accordance with the present disclosure. In this embodiment, semiconductor nanowires will also grow from the exposed horizontal surface of the semiconductor cantilever 12. The semiconductor nanowires that are grown from the exposed horizontal surface of the semiconductor cantilever are not shown in FIG. 16 so as not to obscure the growth of the semiconductor nanowire on the apex 15 of the semiconductor pyramid 14. The semiconductor nanowires that will grow on the (100) horizontal surface of the semiconductor cantilever will not interfere with the AFM imaging because their height is much less than the combined height of the semiconductor pyramid 14 and the semiconductor nanowire 26 at the apex 15 of the semiconductor pyramid 14.

In either the embodiment shown in FIGS. 13-16 or the embodiment shown in FIGS. 17-21, the oxidation sharpening process described above can be employed to further improve the resolution of the AFM tip.

While the present disclosure has been particularly shown and described with respect to various embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A method of fabricating a high resolution AFM tip comprising:
providing an AFM probe including a semiconductor cantilever having a semiconductor pyramid extending upward from a surface of said semiconductor cantilever, said semiconductor pyramid having an apex;
forming a patterned oxide layer on said AFM probe, wherein said patterned oxide layer has an opening that exposes the apex of said semiconductor pyramid; and
forming a semiconductor nanowire on said exposed apex of said semiconductor pyramid utilizing a non-oxidized Al seed material as a catalyst for nanowire growth, wherein said semiconductor nanowire includes a p-doped semiconductor nanowire core and an undoped semiconductor shell surrounding said p-doped semiconductor nanowire core; and
removing said undoped semiconductor shell and said non-oxidized Al seed layer from said p-doped semiconductor nanowire core forming a single p-doped semiconductor nanowire comprising said p-doped semiconductor nanowire core on said exposed apex.

2. The method of claim 1 wherein said forming the patterned oxide layer comprises forming an oxide layer on said AFM probe, forming a patterned photoresist on said oxide layer, wherein said patterned photoresist includes an opening to expose the oxide layer at the apex of the semiconductor pyramid, removing the exposed oxide layer from said apex of the semiconductor pyramid, and removing the patterned photoresist.

3. The method of claim 2 wherein said forming the oxide layer comprises thermal oxidation, said forming the patterned photoresist comprises deposition of a photoresist material and oxygen plasma ashing, and said removing the exposed oxide layer at the apex of the semiconductor pyramid includes etching in HF or buffered HF.

4. The method of claim 1 wherein said forming the patterned oxide layer comprises forming a oxide layer having a thin portion located atop the apex of the semiconductor pyramid and a horizontal surface of the semiconductor pyramid and a thick portion on sidewalls of the semiconductor pyramid, and removing the thin portion from the apex of the semiconductor pyramid and from the horizontal surface of the semiconductor pyramid.

5. The method of claim 4 wherein said apex of the said semiconductor pyramid and said horizontal surface of said semiconductor cantilever have Si (111) planes and said sidewalls of the semiconductor pyramid have Si (100) planes.

6. The method of claim 5 wherein said single p-doped semiconductor nanowire is perpendicularly orientated relative to a base of the semiconductor pyramid.

7. The method of claim 1 wherein said forming the patterned oxide layer includes forming a non-conformal film on said AFM probe, wherein said non-conformal film has a thick portion atop the apex of the semiconductor pyramid and a horizontal surface of the semiconductor pyramid and a thin portion on sidewalls of the semiconductor pyramid, selectively removing the thin portion of the non-conformal film relative to the thick portion of the non-conformal film to expose said sidewalls of said semiconductor pyramid, and performing a thermal oxidation process to form said patterned oxide layer on said exposed sidewalls of said semiconductor pyramid.

8. The method of claim 7 further comprising removing said thick portion of said non-conformal film said at least said horizontal surface of the semiconductor pyramid and optionally from said apex of the semiconductor pyramid after said thermal oxidation and prior to forming said p-doped semiconductor nanowire.

9. The method of claim 8 wherein said non-conformal film comprises Al, and wherein said thick portion of Al is not removed from atop the apex of the semiconductor pyramid and serves as a catalyst for forming said single p-doped semiconductor nanowire.

10. The method of claim 9 wherein said forming the semiconductor nanowire comprises annealing, and wherein said annealing forms said non-oxidized Al seed material used in forming said semiconductor nanowire.

11. The method of claim 10 wherein said forming said semiconductor nanowire further comprises selecting a semiconductor nanowire precursor, and performing nanowire growth at a temperature from 200° C. to 2000° C. utilizing chemical vapor deposition, ultra high vacuum chemical vapor deposition or plasma enhanced chemical vapor deposition.

12. The method of claim 1 wherein forming the semiconductor nanowire includes forming a layer of aluminum on said patterned oxide layer and on said exposed apex of said semiconductor pyramid, thermal annealing, wherein said thermal annealing forms a compound oxide layer in areas in which said layer of aluminum is in direct contact with said patterned oxide layer and the non-oxidized Al seed material on said apex of said semiconductor pyramid, and growing said semiconductor nanowire from said non-oxidized Al seed material.

13. The method of claim 12 wherein said growing said semiconductor nanowire includes selecting a semiconductor nanowire precursor, and performing nanowire growth at a temperature of equal to, or greater than, 200° C. utilizing chemical vapor deposition, ultra high vacuum chemical vapor deposition or plasma enhanced chemical vapor deposition.

14. The method of claim 1 further comprising subjecting the p-doped semiconductor nanowire to an oxidation sharpening process.

15. The method of claim 14 wherein said oxidation sharpening process includes thermal oxidation and removing a surface oxide layer from a thinned p-doped semiconductor nanowire.

16. The method of claim 1 wherein said single p-doped semiconductor nanowire has a diameter from 20 nm to 200 nm, and an aspect ratio of greater than 100:1.

* * * * *